United States Patent
Chen et al.

(10) Patent No.: US 12,476,549 B2
(45) Date of Patent: Nov. 18, 2025

(54) MICRO INVERTER, PHOTOVOLTAIC SYSTEM AND CONTROL METHOD

(71) Applicant: Sungrow Power Supply Co., Ltd., Hefei (CN)

(72) Inventors: Qiaodi Chen, Hefei (CN); Yu Gu, Hefei (CN); Hao Wang, Hefei (CN); Jun Xu, Hefei (CN); Zichen Wang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 203 days.

(21) Appl. No.: 18/500,885

(22) Filed: Nov. 2, 2023

(65) Prior Publication Data
US 2024/0170965 A1  May 23, 2024

(30) Foreign Application Priority Data

Nov. 17, 2022 (CN) .......................... 202211441143.7

(51) Int. Cl.
*H02M 3/335* (2006.01)
*H02J 3/18* (2006.01)
*H02M 7/5387* (2007.01)

(52) U.S. Cl.
CPC ....... *H02M 3/33576* (2013.01); *H02J 3/1878* (2013.01); *H02M 3/33569* (2013.01);
(Continued)

(58) Field of Classification Search
CPC ......... H02M 3/33576; H02M 3/33569; H02M 3/33584; H02M 7/53871; H02J 3/1878;
(Continued)

(56) References Cited

U.S. PATENT DOCUMENTS

2009/0034299 A1\* 2/2009 Lev .................... H02M 3/33592
  363/17
2014/0078782 A1\* 3/2014 Rosado ............. H02M 3/33584
  363/17
(Continued)

FOREIGN PATENT DOCUMENTS

WO   WO 2021/252911 A1   12/2021

OTHER PUBLICATIONS

Extended European Search Report for European Application No. 23207931.9, dated Mar. 22, 2024.
(Continued)

*Primary Examiner* — Yusef A Ahmed
(74) *Attorney, Agent, or Firm* — Wolf, Greenfield & Sacks, P.C.

(57) ABSTRACT

A micro inverter, a photovoltaic system and a method for controlling a micro inverter are provided. The micro inverter includes a controller, a primary H-bridge, a transformer, a bi-directional switch arm and a capacitor arm. The controller is configured to: determine a reactive current based on a grid voltage, an equivalent capacitance of an output terminal of the inverter and a grid angle; add the reactive current to a given current to generate an internal phase-shift angle and an external phase-shift angle from a new given current obtained through the addition, where the internal phase-shift angle refers to a phase-shift angle between two arms of the primary H-bridge and the external phase-shift angle refers to a phase-shift angle between the primary H-bridge and the bi-directional switch arm.

8 Claims, 3 Drawing Sheets

(52) U.S. Cl.
CPC ..... *H02M 3/33584* (2013.01); *H02J 2300/24* (2020.01); *H02J 2300/26* (2020.01); *H02M 7/53871* (2013.01)

(58) Field of Classification Search
CPC ...... H02J 2300/24; H02J 2300/26; H02J 3/50; H02J 3/381; Y02E 10/56
See application file for complete search history.

(56) References Cited

U.S. PATENT DOCUMENTS

| | | | | |
|---|---|---|---|---|
| 2015/0333634 | A1* | 11/2015 | Yoshida | H02M 3/3353 363/21.03 |
| 2019/0149086 | A1* | 5/2019 | Jin | H02J 3/388 136/244 |
| 2020/0169216 | A1* | 5/2020 | Han | H02M 3/33576 |
| 2022/0045619 | A1* | 2/2022 | Jia | H02M 3/33573 |
| 2022/0360181 | A1* | 11/2022 | Winter | H02M 3/33592 |
| 2022/0360182 | A1* | 11/2022 | Hirota | H02M 1/08 |
| 2022/0416673 | A1* | 12/2022 | Zhang | H02M 7/797 |
| 2023/0179091 | A1* | 6/2023 | Liu | H02M 3/33573 363/17 |
| 2024/0146204 | A1* | 5/2024 | Mo | H02M 3/33592 |
| 2025/0030356 | A1* | 1/2025 | Chen | H02M 1/0083 |
| 2025/0045501 | A1* | 2/2025 | Li | G06F 30/367 |
| 2025/0047188 | A1* | 2/2025 | Cao | H02M 3/33573 |
| 2025/0047197 | A1* | 2/2025 | Maezaki | H02M 1/15 |

OTHER PUBLICATIONS

Bhattacharjee et al., An Interleaved Boost and Dual Active Bridge Based Three Port Microinverter. In2020 IEEE Applied Power Electronics Conference and Exposition (APEC). Mar. 15, 2020;1320-6.

Kwon et al., Highly efficient single-stage DAB microinverter using a novel modulation strategy to minimize reactive power. IEEE Journal of Emerging and Selected Topics in Power Electronics. Jun. 17, 2021;10(1):544-52.

Sayed et al., Advanced PWM Switching Technique for Accurate Unity Power Factor of Bidirectional Three-Phase Grid-Tied DC-AC Converters. IEEE Transactions on Industry Applications. Nov. 1, 2019;55(6):7614-27.

* cited by examiner

MICRO INVERTER, PHOTOVOLTAIC SYSTEM AND CONTROL METHOD

This application claims priority to Chinese application No. 202211441143.7, titled "MICRO INVERTER, PHOTOVOLTAIC SYSTEM AND CONTROL METHOD", filed on Nov. 17, 2022 with the China National Intellectual Property Administration, which is incorporated herein by reference in its entirety.

FIELD

The present disclosure relates to the technical field of photovoltaic power generation, and in particular to a micro inverter, a photovoltaic system and a method for controlling the micro inverter.

BACKGROUND

Photovoltaic power generation develops and is increasingly applied to households. With the development of household photovoltaic systems, a household inverter has smaller size, and micro inverters are provided.

However, due to a capacitor at an output terminal of the micro inverter, a reactive current is generated when a grid voltage is applied on the capacitor. The reactive current has a great impact on a grid current.

SUMMARY

In view of this, a micro inverter, a photovoltaic system and a method for controlling the micro inverter are provided according to the present disclosure, in order to reduce an impact of a reactive current on a grid current.

A micro inverter is provided according to the present disclosure. The micro inverter includes a controller, a primary H-bridge, a transformer, a bi-directional switch arm, and a capacitor arm. An input terminal of the primary H-bridge is connected to a direct current power supply. Two output terminals of the primary H-bridge are connected to two terminals of a primary side of the transformer, respectively. Two terminals on a secondary side of the transformer are connected to an intermediate terminal of the bi-directional switch arm and an intermediate terminal of the capacitor arm, respectively. The bi-directional switch arm and the capacitor arm are connected in parallel. The controller is configured to: determine a reactive current based on a grid voltage, an equivalent capacitance of an output terminal of the inverter and a grid angle; add the reactive current to a given current to generate an internal phase-shift angle and an external phase-shift angle from a new given current obtained through the addition, where the internal phase-shift angle refers to a phase-shift angle between two arms of the primary H-bridge and the external phase-shift angle refers to a phase-shift angle between the primary H-bridge and the bi-directional switch arm.

Preferably, the primary H-bridge is in a quantity of one. The input terminal of the primary H-bridge is configured to connect to a photovoltaic component. The given current is obtained through maximum power point tracking of the photovoltaic component.

Preferably, the primary H-bridge is in a quantity of N and the transformer is in a quantity of N, where N is an integer greater than or equal to 1. The N transformers share the bi-directional switch arm and the capacitor arm. Each primary H-bridge has an input terminal configured to connect to a corresponding photovoltaic component. Each photovoltaic component corresponds to a given current obtained through maximum power point tracking of the photovoltaic component. The controller is configured to determine an average reactive current by dividing the reactive current by M, where M is an integer less than or equal to N; and for each photovoltaic component for power transmission, add the average reactive current to a given current corresponding to the photovoltaic component, and generate the internal phase-shift angle and the external phase-shift angle from a new given current obtained through the addition.

Preferably, the controller is configured to determine the reactive current based on a d-axis component of the grid voltage, an angular frequency of the grid voltage, the equivalent capacitance of the output terminal of the inverter, and a cosine value of the grid angle.

Preferably, the d-axis component of the grid voltage and the angular frequency of the grid voltage are obtained through a phase locked loop.

Preferably, the transformer includes a primary winding and a secondary winding. An upper half of the bi-directional switch arm includes a first switch transistor and a second switch transistor connected in series, and a lower half of the bi-directional switch arm includes a third switch transistor and a fourth switch transistor connected in series. An upper half of the capacitor arm includes at least one capacitor, and a lower half of the capacitor arm includes at least one capacitor.

A photovoltaic system is further provided according to the present disclosure. The photovoltaic system includes the micro inverter described above and at least one photovoltaic component. An input terminal of the micro inverter is connected to the photovoltaic component.

A method for controlling a micro inverter is further provided according to the present disclosure. The micro inverter includes a primary H-bridge, a transformer, a bi-directional switch arm and a capacitor arm. An input terminal of the primary H-bridge is connected to a direct current power supply. Two output terminals of the primary H-bridge are connected to two terminals of a primary side of the transformer, respectively; and two terminals on a secondary side of the transformer are connected to an intermediate terminal of the bi-directional switch arm and an intermediate terminal of the capacitor arm, respectively. The bi-directional switch arm and the capacitor arm are connected in parallel. The method includes: determining a reactive current based on a grid voltage, an equivalent capacitance of an output terminal of the inverter and a grid angle; and adding the reactive current to a given current to generate an internal phase-shift angle and an external phase-shift angle from a new given current obtained through the addition, wherein the internal phase-shift angle refers to a phase-shift angle between two arms of the primary H-bridge and the external phase-shift angle refers to a phase-shift angle between the primary H-bridge and the bi-directional switch arm.

Preferably, the primary H-bridge is in a quantity of one. The input terminal of the primary H-bridge is configured to connect to a photovoltaic component. The given current is obtained through maximum power point tracking of the photovoltaic component.

Preferably, the primary H-bridge is in a quantity of N and the transformer is in a quantity of N, where N is an integer greater than or equal to 1. The N transformers share the bi-directional switch arm and the capacitor arm. Each primary H-bridge has an input terminal configured to connect to a corresponding photovoltaic component. Each photovoltaic component corresponds to a given current obtained through maximum power point tracking of the photovoltaic component. The adding the reactive current to a given current to generate an internal phase-shift angle and an external phase-shift angle from a new given current obtained through the addition includes: determining an average reactive current by dividing the reactive current by M, where M is an integer less than or equal to N; and for each photovoltaic component for power transmission, adding the average reactive current to a given current corresponding to the photovoltaic component, and generating the internal phase-shift angle and the external phase-shift angle from a new given current obtained through the addition.

Preferably, the determining a reactive current based on a grid voltage, an equivalent capacitance of an output terminal of the inverter and a grid angle includes: determining the reactive current based on a d-axis component of the grid voltage, an angular frequency of the grid voltage, the equivalent capacitance of the output terminal of the inverter, and a cosine value of the grid angle.

Preferably, the d-axis component of the grid voltage and the angular frequency of the grid voltage are obtained through a phase locked loop.

It can be seen that the present disclosure has the following beneficial effects.

In the micro inverter according to the present disclosure, it is considered that the reactive current generated due to the equivalent capacitor at the output terminal of the inverter has an impact on a quality of a grid-connected current. Therefore, the reactive current is compensated in the present disclosure. The reactive current is determined based on the grid voltage, the equivalent capacitance of the output terminal of the inverter and the grid angle. The reactive current is added to the given current to generate the internal phase-shift angle and the external phase-shift angle from the new given current obtained through the addition. In this way, the impact of the reactive current on the grid-connected current is reduced. The reactive current is added to the given current in feedforward control in advance, so that the quality of the grid-connected current is improved.

DETAILED DESCRIPTION OF EMBODIMENTS

In order to enable those skilled in the art to better understand the technical solutions according to the embodiments of the present disclosure, a micro inverter is first described below by taking an example in which the micro inverter is applied to a household photovoltaic system.

Figure 1:
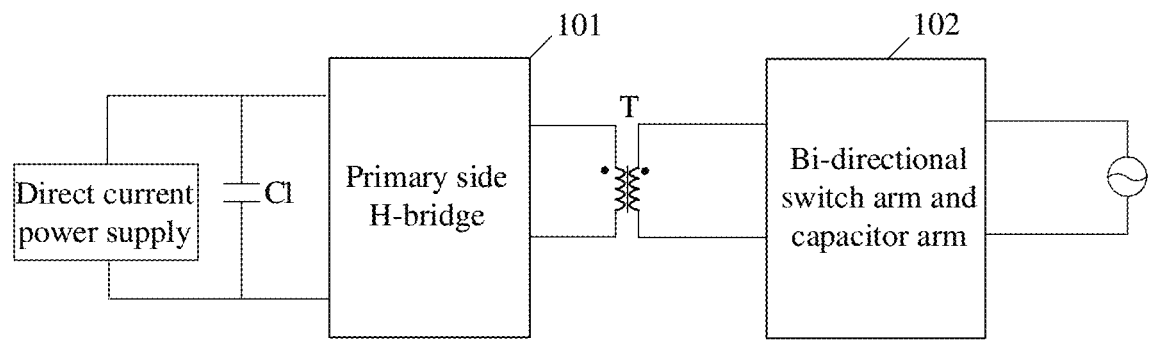
FIG. 1 is a schematic diagram of a micro inverter according to an embodiment of the present disclosure.

Reference is made to FIG. 1, which is a schematic diagram of a micro inverter according to an embodiment of the present disclosure.

The micro inverter is an isolated inverter, including a transformer for realizing isolation between a primary side and a secondary side. The micro inverter includes a primary H-bridge 101, a transformer T, a bi-directional switch arm and a capacitor arm 102. The transformer T includes the primary winding, the secondary winding, and an inductor L.

An input terminal of the primary H-bridge 101 is connected to a direct current power supply. The direct current power supply may be a photovoltaic component or a battery. The present disclosure is described by taking an example in which the direct current power supply is a photovoltaic component. Two output terminals of the primary H-bridge 101 are connected to two terminals on the primary side of the transformer T, respectively. Two terminals on the secondary side of the transformer T are connected to an intermediate terminal of the bi-directional switch arm and an intermediate terminal of the capacitor arm, respectively. The bi-directional switch arm and the capacitor arm 102 are connected in parallel.

Figure 2:
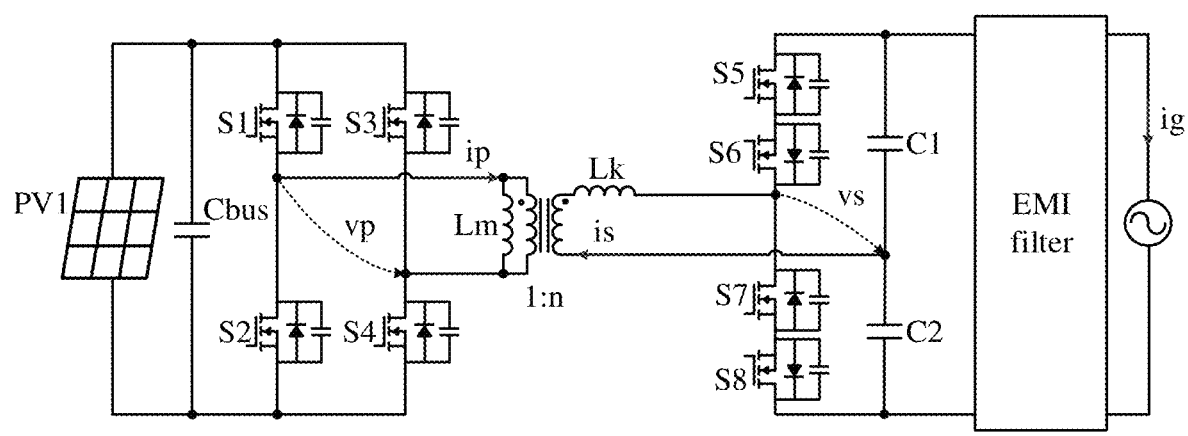
FIG. 2 is a circuit diagram of a micro inverter according to an embodiment of the present disclosure.

Reference is made to FIG. 2, which is a circuit diagram of a micro inverter according to an embodiment of the present disclosure.

As shown in FIG. 2, the primary H-bridge includes four switch transistors, i.e., S1, S2, S3 and S4. The switch transistor S1 and the switch transistor S2 are connected in series to form a first inverter bridge arm. The switch transistor S3 and the switch transistor S4 are connected in series to form a second inverter bridge arm. A common terminal shared by the switch transistor S1 and the switch transistor S2 serves as a first output terminal of the primary H-bridge. A common terminal shared by the switch transistor S3 and the switch transistor S4 serves as a second output terminal of the primary H-bridge. An output voltage of the primary H-bridge is represented as vp, and an output current of the primary H-bridge is represented as ip. A turn ratio of the primary winding to the secondary winding of the transformer is 1:n. A magnetic inductance of the transformer T is represented as Lm. A leakage inductance of the transformer T is represented as Lk. An output current of the transformer T is represented as is. A voltage on the secondary side of the transformer T is represented as vs.

An upper half of the bi-directional switch arm includes a fifth switch transistor S5 and a sixth switch transistor S6, which are connected in series. A lower half of the bi-directional switch arm includes a seventh switch transistor S7 and an eighth switch transistor S8, which are connected in series. In a case that the grid voltage is greater than zero, the switch transistors on the secondary side operate in a mode 1. In the mode 1, the S5 and the S7 serve as high-frequency transistors for high-frequency chopping, and the S6 and the S8 are conducted. In a case that the grid voltage is less than zero, the switch transistors on the secondary side operate in a mode 2. In the mode 2, the S6 and the S8 serve as high-frequency transistors for high-frequency chopping, and the S5 and the S7 are conducted.

An upper half of the capacitor arm includes at least one capacitor, and a lower half of the capacitor arm includes at least one capacitor. In an embodiment, the upper half of the capacitor arm includes a capacitor C1 and the lower half of the capacitor arm includes a capacitor C2.

The micro inverter can realize a single-stage on-grid function by controlling an external phase-shift angle, which is between the primary H-bridge arm and the secondary arm, and an internal phase-shift angle, which is between the two arms of the primary H-bridge. The micro inverter has two degrees of freedom, i.e., D1 for the internal phase-shift angle between the two arms of the primary H-bridge and D2 for the external phase-shift angle between the primary H-bridge arm and the secondary arm. Power transmission is realized by controlling the D1 and the D2. The D1 is defined to be an angle by which a phase of the S4 lags behind a phase of the S1. The D2 is defined to be an angle by which a phase of the S5 (or the S8) lags behind the phase of the S1.

In addition, the output terminal of the micro inverter may further include an EMI filter circuit for filtering out an interference signal, so as to provide a high-quality grid-connected current. An output current of the micro inverter, or the grid-connected current, is represented as ig.

In the micro inverter as shown in FIG. 2, the transformer is in a quantity of one, corresponding to one PV input. It should be understood that the PV input may be a photovoltaic component. The micro inverter according to another embodiment of the present disclosure may include multiple PV inputs, corresponding to multiple transformers and multiple primary H-bridges, which is described in detail below in conjunction with the drawings.

Figure 3:
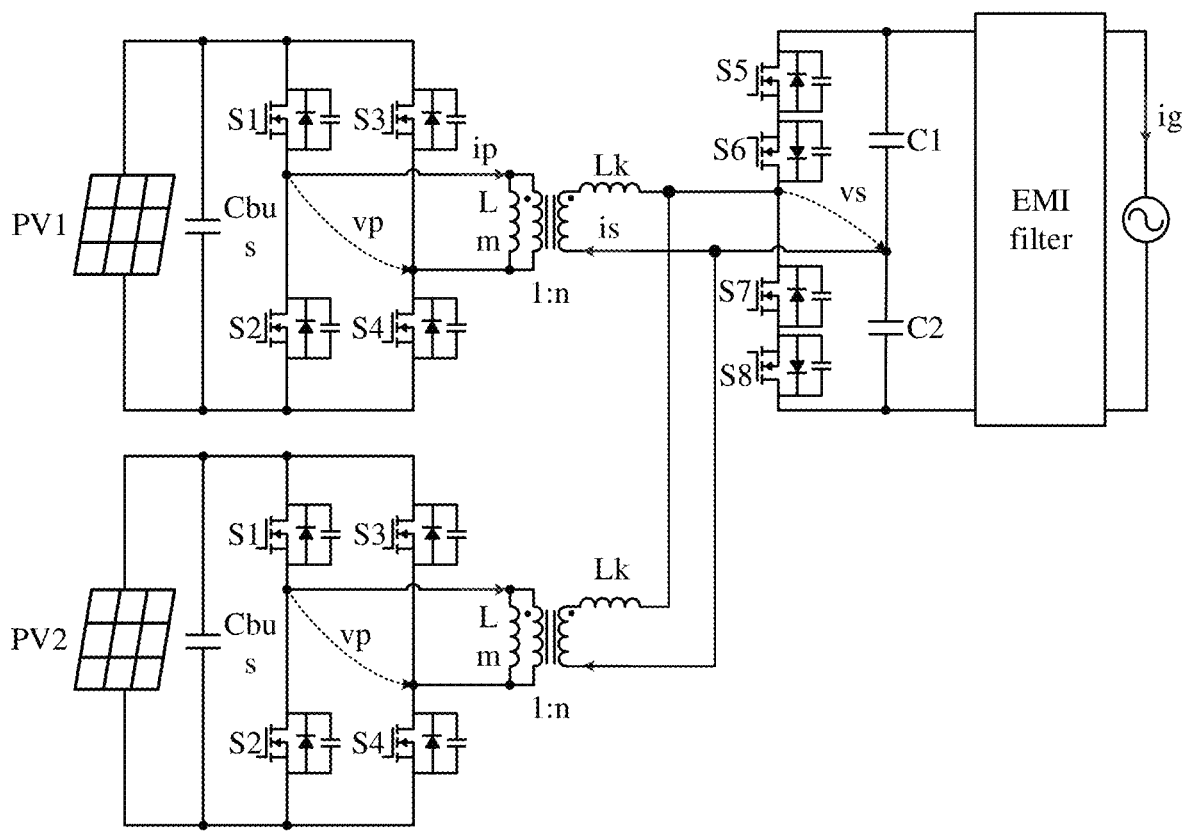
FIG. 3 is a circuit diagram of a micro inverter according to another embodiment of the present disclosure.

Reference is made to FIG. 3, which is a circuit diagram of a micro inverter according to another embodiment of the present disclosure.

In this embodiment, the micro inverter includes N primary H-bridges and N transformers. The N transformers share a same bi-directional switch arm and a same capacitor arm. N is an integer greater than or equal to 1, which is not limited in the embodiments of the present disclosure. A case in which N is equal to 2 is taken as an example in this embodiment for convenience of description.

As shown in FIG. 3, the micro inverter includes two primary H-bridges and two transformers. Connections in the micro inverter may be as shown in FIG. 2 and are not repeated here. Output terminals on the secondary sides of the inverter are connected in parallel and share a same bi-directional switch arm and a same capacitor arm.

The internal phase-shift angle and the external phase-shift angle are controlled, so that capacitance of the capacitor C1 and the capacitor C2 in the secondary arm are required to be large (8 uF, for example), in order to ensure that a voltage of the secondary side of the transformer remains unchanged in a switching cycle. A reactive current is generated in the capacitor C1 and the capacitor C2 when the grid voltage is applied on the capacitor C1 and the capacitor C2.

The reactive current has a great impact on the grid-connected current. The grid-connected current has a leading phase in a case of no closed loop added. Even if a closed-loop control of a current is added, the reactive current has an adverse impact on the closed-loop control.

To solve the above problem, a reactive power compensation solution is provided according to the present disclosure to reduce the impact of the reactive current on the grid-connected current.

In order to make the above objectives, features and advantages of the present disclosure more obvious and easier to be understood, the embodiments of the present disclosure are described in detail below in conjunction with the drawings and embodiments.

Figure 4:
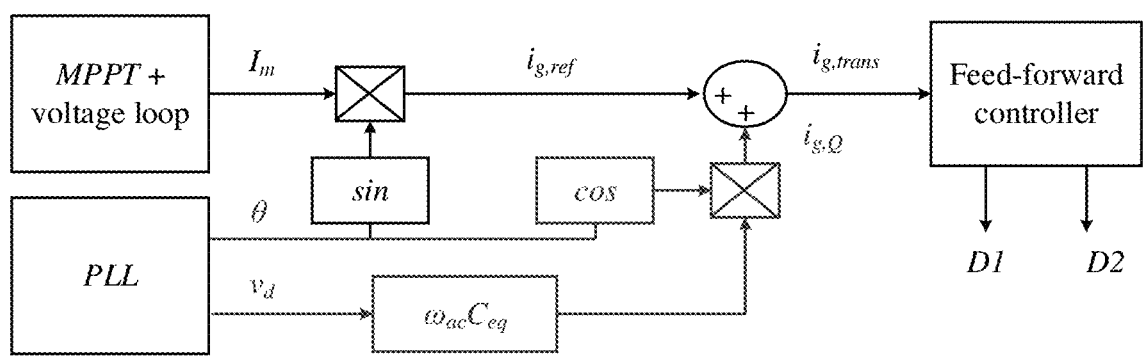
FIG. 4 is a schematic diagram showing a control principle of a micro inverter according to an embodiment of the present disclosure.

Reference is made to FIG. 4, which is a schematic diagram showing a control principle of a micro inverter according to an embodiment of the present disclosure.

The micro inverter according to this embodiment includes a controller (not shown in the Figure), a primary H-bridge, a transformer, a bi-directional switch arm and a capacitor arm. Connections in the micro inverter may be with reference to FIG. 1 and FIG. 2, which is not described here.

The controller is configured to: determine a reactive current based on a grid voltage, an equivalent capacitance of an output terminal of the inverter and a grid angle; add the reactive current to a given current $i_{g,ref}$ to generate an internal phase-shift angle D1 and an external phase-shift angle D2 from a new given current $i_{g,trans}$ obtained through the addition. The internal phase-shift angle D1 refers to a phase-shift angle between the two arms of the primary H-bridge. The external phase-shift angle D2 refers to a phase-shift angle between the primary H-bridge and the bi-directional switch arm.

The given current $i_{g,ref}$ is obtained through maximum power point tracking of the photovoltaic component. As shown in the Figure, am amplitude $i_m$ of the given current is obtained through MPPT and a voltage loop. $I_{g,ref}$ represents a cosine value of $I_m$, i.e., a product of $I_m$ and sin θ.

The controller is specifically configured to determine the reactive current based on a d-axis component of the grid voltage, an angular frequency of the grid voltage, the equivalent capacitance of the output terminal of the inverter, and the cosine value of the grid angle according to the following equation:

$$i_{g,Q} = \omega_{ac} V_d C_{eq} \cos\theta$$

In the above equation, $i_{g,Q}$ represents the reactive current; $V_d$ represents the d-axis component of the grid voltage; $C_{eq}$ represents the equivalent capacitance of the output terminal of the inverter, i.e., the equivalent capacitance view from the output terminal of the inverter; θ represents the grid angle; and $\omega_{ac}$ represents the angular frequency of grid voltage.

The d-axis component of the grid voltage and the angular frequency of the grid voltage are obtained through a phase locked loop (PLL).

In the micro inverter as shown in FIG. 2, the input terminal is connected to only one PV device, and therefore the reactive current is added to only the given current for this PV device. That is, the micro inverter includes one primary H-bridge, and the input terminal of the primary H-bridge is configured to connect to a photovoltaic component. The given current is obtained through maximum power point tracking of the photovoltaic component.

In a case that the micro inverter is connected to multiple PV devices, as shown in FIG. 3, it is necessary to determine operation states of the multiple PV devices. In a case that only one PV device of the multiple PV devices performs power transmission, the reactive current may be added to this PV device. In a case that multiple PV devices perform power transmission, the reactive current may be evenly added to the multiple PV devices, so as to avoid inconsistency in controlling of the multiple PV devices caused by adding all reactive power to a single PV device, thereby reducing the impact of reactive power compensation on control. That is, the micro inverter includes N primary H-bridges and N transformers, and the N transformers share a same bi-directional switch arm and a same capacitor arm. N is an integer greater than or equal to 1. Each primary H-bridge has an input terminal configured to connect to a photovoltaic component. Each photovoltaic component corresponds to a given current obtained through maximum power point tracking of the photovoltaic component.

The controller is configured to: determine an average reactive current by dividing the reactive current by M, where M is an integer less than or equal to N; and for each photovoltaic component for power transmission: add the average reactive current to a given current corresponding to the photovoltaic component, and generate the internal phase-shift angle and the external phase-shift angle from a new given current obtained through the addition. M represents the number of the photovoltaic components for power transmission among the N photovoltaic components, that is, the number of photovoltaic components that are connected to the direct current side of the inverter and used for power transmission.

A photovoltaic system is further provided according to an embodiment of the present disclosure based on the micro inverter according to the above embodiment. The photovoltaic system is described below in conjunction with the drawings.

Figure 5:
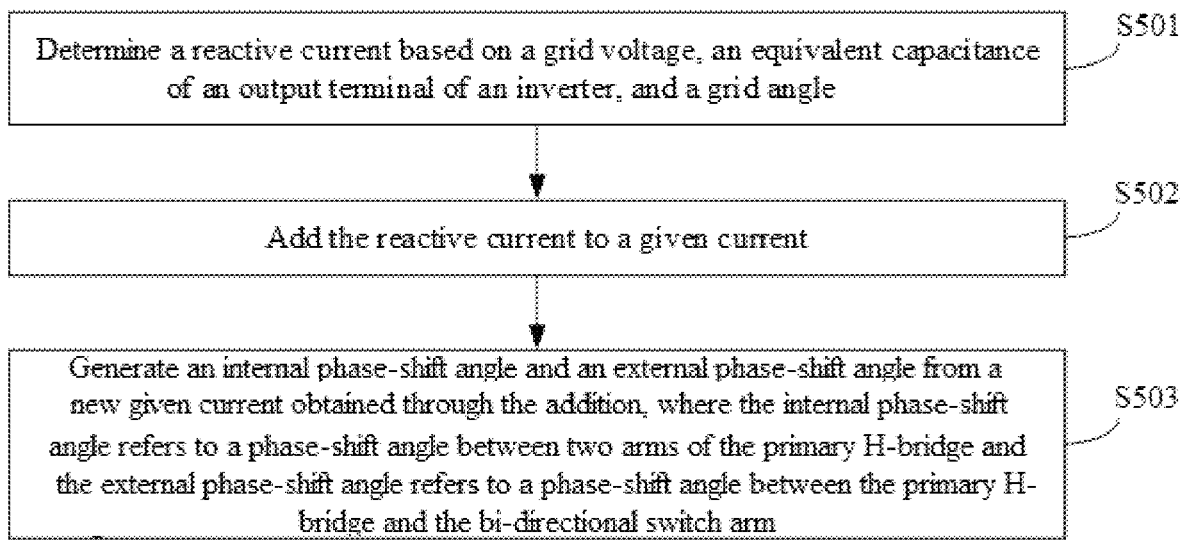
FIG. 5 is a flow chart of a method for controlling a micro inverter according to an embodiment of the present disclosure.

Reference is made to FIG. 5, which is a schematic diagram of a photovoltaic system according to an embodiment of the present disclosure.

In an embodiment, the photovoltaic system includes at least one photovoltaic component and a micro inverter 500 as described in the above embodiment. An input terminal of the micro inverter 500 is connected to the photovoltaic component.

The micro inverter in the photovoltaic system according to the embodiment of the present disclosure can compensate the reactive current generated by the capacitor at the output terminal of the micro inverter. Therefore, with the photovoltaic system, the impact of the reactive current on the grid can be reduced, and thereby the quality of the grid-connected current is improved.

Based on the micro inverter and the photovoltaic system according to the above embodiments, a method for controlling a micro inverter is further provided according to an embodiment of the present disclosure, which is described in detail below in conjunction with the drawings.

Reference is made to FIG. 5, which is a flowchart of a method for controlling a micro inverter according to an embodiment of the present disclosure.

The method for controlling a micro inverter according to this embodiment is applied to the micro inverter as described in the above embodiments. The micro inverter includes a primary H-bridge, a transformer, a bi-directional switch arm and a capacitor arm. An input terminal of the primary H-bridge is connected to a direct current power supply. Two output terminals of the primary H-bridge are connected to two terminals on the primary side of the transformer, respectively. Two terminals on the secondary side of the transformer are connected to an intermediate terminal of the bi-directional switch arm and an intermediate terminal of the capacitor arm, respectively. The bi-directional switch arm and the capacitor arm are connected in parallel.

The method includes the following steps S501 to S503.

In step S501, a reactive current is determined based on a grid voltage, an equivalent capacitance of an output terminal of the inverter and a grid angle.

A process of determining the reactive current based on the grid voltage, the equivalent capacitance of the output terminal of the inverter and the grid angle includes: determining the reactive current based on a d-axis component of the grid voltage, an angular frequency of the grid voltage, the equivalent capacitance of the output terminal of the inverter, and a cosine value of the grid angle.

The d-axis component of the grid voltage and the angular frequency of the grid voltage are obtained through a phase locked loop.

In step S502, the reactive current is added to a given current.

A process of adding the reactive current to the given current to generate an internal phase-shift angle and an external phase-shift angle from a new given current obtained through the addition includes: determining an average reactive current by dividing the reactive current by M, where M is an integer less than or equal to N; and for each photovoltaic component for power transmission, adding the average reactive current to a given current corresponding to the photovoltaic component, and generating the internal phase-shift angle and the external phase-shift angle from a new given current obtained through the addition. M represents the number of photovoltaic components for power transmission among the N photovoltaic components.

In step S503, an internal phase-shift angle and an external phase-shift angle are generated from a new given current obtained through the addition of the reactive current and the given current. The internal phase-shift angle refers to a phase-shift angle between the two arms of the primary H-bridge. The external phase-shift angle refers to a phase-shift angle between the primary H-bridge and the bi-directional switch arm.

In a case that the primary H-bridge included in the micro inverter is in a quantity of one, an input terminal of the primary H-bridge is configured to connect to a photovoltaic component. The given current is obtained through maximum power point tracking of the photovoltaic component.

In a case that the primary H-bridge included in the micro inverter is in a quantity of N and the transformer included in the micro inverter is in a quantity of M, the N transformers share a same bi-directional switch arm and a same capacitor arm. N is an integer greater than or equal to 1. Each primary H-bridge has an input terminal configured to connect to a photovoltaic component. Each photovoltaic component corresponds to a given current obtained through maximum power point tracking of the photovoltaic component.

With the method for controlling a micro inverter according to the present disclosure, it is considered that the reactive current generated due to the equivalent capacitor at the output terminal of the inverter has an impact on a quality of a grid-connected current. Therefore, the reactive current is compensated in the present disclosure. The reactive current is determined based on the grid voltage, the equivalent capacitance of the output terminal of the inverter and the grid angle. The reactive current is added to the given current to generate the internal phase-shift angle and the external phase-shift angle from the new given current obtained through the addition. In this way, the impact of the reactive current on the grid-connected current is reduced. The reactive current is added to the given current in feedforward control in advance, so that the quality of the grid-connected current is improved.

With the above description of the disclosed embodiments, those skilled in the art can implement or use the present disclosure. It is obvious for those skilled in the art to make many modifications to these embodiments. The general principle defined herein may be applied to other embodiments without departing from the spirit or scope of the present disclosure. Therefore, the present disclosure should not be limited to the embodiments described herein but have the widest scope that complies with the principle and novelty disclosed in the present disclosure.

The invention claimed is:

1. A micro inverter, comprising a controller, a primary H-bridge, a transformer, a bi-directional switch arm, and a capacitor arm, wherein
    an input terminal of the primary H-bridge is connected to a direct current power supply;
    two output terminals of the primary H-bridge are connected to two terminals on a primary side of the transformer, respectively;
    two terminals on a secondary side of the transformer are connected to an intermediate terminal of the bi-directional switch arm and an intermediate terminal of the capacitor arm, respectively;

the bi-directional switch arm and the capacitor arm are connected in parallel; and the controller is configured to:

determine a reactive current based on a grid voltage, an equivalent capacitance of an output terminal of the micro inverter and a grid angle;

add the reactive current to a given current to generate an internal phase-shift angle and an external phase-shift angle from a new given current obtained through the addition, wherein the internal phase-shift angle refers to a phase-shift angle between two arms of the primary H-bridge and the external phase-shift angle refers to a phase-shift angle between the primary H-bridge and the bi-directional switch arm;

wherein the controller is configured to: determine the reactive current based on a d-axis component of the grid voltage, an angular frequency of the grid voltage, the equivalent capacitance of the output terminal of the micro inverter, and a cosine value of the grid angle, and wherein the d-axis component of the grid voltage and the angular frequency of the grid voltage are obtained through a phase locked loop.

2. The micro inverter according to claim 1, wherein:

the primary H-bridge is in a quantity of one;

the input terminal of the primary H-bridge is configured to connect to a photovoltaic component; and the given current is obtained through maximum power point tracking of the photovoltaic component.

3. The micro inverter according to claim 1, wherein:

the primary H-bridge is in a quantity of N and the transformer is in a quantity of N, where N is an integer greater than or equal to 2, the N transformers share the bi-directional switch arm and the capacitor arm, and each primary H-bridge has an input terminal configured to connect to a corresponding photovoltaic component, each photovoltaic component corresponds to a respective given current obtained through maximum power point tracking of the respective photovoltaic component; and the controller is configured to determine an average reactive current by dividing the reactive current by M, where M is an integer less than or equal to N; and for each photovoltaic component for power transmission, add the average reactive current to a respective given current corresponding to the respective photovoltaic component, and generate the internal phase-shift angle and the external phase-shift angle from a new given current obtained through the addition.

4. The micro inverter according to claim 1, wherein:

the transformer comprises a primary winding and a secondary winding;

an upper half of the bi-directional switch arm comprises a first switch transistor and a second switch transistor connected in series, and a lower half of the bi-directional switch arm comprises a third switch transistor and a fourth switch transistor connected in series; and an upper half of the capacitor arm comprises at least one capacitor, and a lower half of the capacitor arm comprises at least one capacitor.

5. A photovoltaic system, comprising a micro inverter and at least one photovoltaic component, wherein an input terminal of the micro inverter is connected to the at least one photovoltaic component, the micro inverter comprises a controller, a primary H-bridge, a transformer, a bi-directional switch arm, and a capacitor arm, an input terminal of the primary H-bridge is connected to the at least one photovoltaic component;

two output terminals of the primary H-bridge are connected to two terminals on a primary side of the transformer, respectively;

two terminals on a secondary side of the transformer are connected to an intermediate terminal of the bi-directional switch arm and an intermediate terminal of the capacitor arm, respectively;

the bi-directional switch arm and the capacitor arm are connected in parallel; and the controller is configured to:

determine a reactive current based on a grid voltage, an equivalent capacitance of an output terminal of the micro inverter and a grid angle;

add the reactive current to a given current to generate an internal phase-shift angle and an external phase-shift angle from a new given current obtained through the addition, wherein the internal phase-shift angle refers to a phase-shift angle between two arms of the primary H-bridge and the external phase-shift angle refers to a phase-shift angle between the primary H-bridge and the bi-directional switch arm;

wherein the controller is configured to: determine the reactive current based on a d-axis component of the grid voltage, an angular frequency of the grid voltage, the equivalent capacitance of the output terminal of the micro inverter, and a cosine value of the grid angle, and wherein the d-axis component of the grid voltage and the angular frequency of the grid voltage are obtained through a phase locked loop.

6. A method for controlling a micro inverter, wherein:

the micro inverter comprises a primary H-bridge, a transformer, a bi-directional switch arm and a capacitor arm, an input terminal of the primary H-bridge is connected to a direct current power supply; two output terminals of the primary H-bridge are connected to two terminals on a primary side of the transformer, respectively; two terminals on a secondary side of the transformer are connected to an intermediate terminal of the bi-directional switch arm and an intermediate terminal of the capacitor arm, respectively; and the bi-directional switch arm and the capacitor arm are connected in parallel; and the method comprises:

determining a reactive current based on a grid voltage, an equivalent capacitance of an output terminal of the micro inverter and a grid angle; and adding the reactive current to a given current to generate an internal phase-shift angle and an external phase-shift angle from a new given current obtained through the addition, wherein the internal phase-shift angle refers to a phase-shift angle between two arms of the primary H-bridge and the external phase-shift angle refers to a phase-shift angle between the primary H-bridge and the bi-directional switch arm;

wherein the determining the reactive current based on the grid voltage, the equivalent capacitance of the output terminal of the micro inverter and the grid angle comprises:

determining the reactive current based on a d-axis component of the grid voltage, an angular frequency of the grid voltage, the equivalent capacitance of the output terminal of the micro inverter, and a cosine value of the grid angle; and wherein the d-axis component of the grid voltage and the angular frequency of the grid voltage are obtained through a phase locked loop.

7. The method according to claim 6, wherein:
the primary H-bridge is in a quantity of one;
the input terminal of the primary H-bridge is configured to connect to a photovoltaic component; and
the given current is obtained through maximum power point tracking of the photovoltaic component.

8. The method according to claim 6, wherein
the primary H-bridge is in a quantity of N and the transformer is in a quantity of N, where N is an integer greater than or equal to 2,
the N transformers share the bi-directional switch arm and the capacitor arm, and
each primary H-bridge has an input terminal configured to connect to a corresponding photovoltaic component, each photovoltaic component corresponds to a respective given current obtained through maximum power point tracking of the respective photovoltaic component; and
the adding the reactive current to a given current to generate an internal phase-shift angle and an external phase-shift angle from a new given current obtained through the addition comprises:
determining an average reactive current by dividing the reactive current by M, where M is an integer less than or equal to N; and
for each photovoltaic component for power transmission, adding the average reactive current to a respective given current corresponding to the respective photovoltaic component and generating the internal phase-shift angle and the external phase-shift angle from a new given current obtained through the addition.

* * * * *